United States Patent [19]
Takahashi et al.

[11] Patent Number: 5,721,838
[45] Date of Patent: *Feb. 24, 1998

[54] DATA STORAGE SYSTEM HAVING A DATA STORAGE APPARATUS CONNECTABLE TO A COMPUTER SYSTEM THROUGH AN INTERFACE

[75] Inventors: Tsuyoshi Takahashi, Higashine; Isamu Tomita, Kawasaki, both of Japan

[73] Assignee: Fujitsu Limited, Kawasaki, Japan

[*] Notice: The term of this patent shall not extend beyond the expiration date of Pat. No. 5,625,777.

[21] Appl. No.: 733,009

[22] Filed: Oct. 16, 1996

Related U.S. Application Data

[63] Continuation of Ser. No. 388,620, Feb. 17, 1995, Pat. No. 5,625,777, which is a continuation of Ser. No. 798,969, Nov. 27, 1991, abandoned.

[30] Foreign Application Priority Data

Nov. 29, 1990 [JP] Japan .................................. 2-332920

[51] Int. Cl.$^6$ .............. G06F 13/00; H05K 7/00; H01R 13/642; H01R 9/09
[52] U.S. Cl. .............. 395/283; 361/685; 439/928.1; 360/97.01; 360/98.01
[58] Field of Search ...................... 395/282, 283, 395/821; 360/97.01, 98.01, 133; 364/514 B; 361/685; 439/928.1

[56] References Cited

U.S. PATENT DOCUMENTS

| | | |
|---|---|---|
| 4,200,865 | 4/1980 | Morioka et al. . |
| 4,403,288 | 9/1983 | Christian et al. . |
| 4,494,215 | 1/1985 | Koike et al. . |
| 4,658,375 | 4/1987 | Onogi et al. .................. 395/822 |
| 4,870,643 | 9/1989 | Bultman et al. . |
| 4,989,205 | 1/1991 | Dumpky, Jr. et al. . |
| 4,999,787 | 3/1991 | McNally et al. .................. 364/514 B |
| 5,023,831 | 6/1991 | Bonke et al. .................. 395/836 |
| 5,047,708 | 9/1991 | Kondner, Jr. . |
| 5,051,606 | 9/1991 | Ikehara . |
| 5,077,722 | 12/1991 | Geist et al. . |
| 5,097,439 | 3/1992 | Patriquin et al. . |
| 5,122,914 | 6/1992 | Hanson . |
| 5,134,619 | 7/1992 | Henson et al. . |
| 5,157,771 | 10/1992 | Losi et al. .................. 395/283 |
| 5,185,881 | 2/1993 | Brooks et al. . |
| 5,186,646 | 2/1993 | Pederson . |
| 5,202,965 | 4/1993 | Ahn et al. .................. 395/283 |
| 5,247,619 | 9/1993 | Mutoh et al. .................. 395/283 |
| 5,247,640 | 9/1993 | Malhara . |
| 5,277,615 | 1/1994 | Hastings et al. . |
| 5,327,308 | 7/1994 | Hanson .................. 360/97.01 |
| 5,339,446 | 8/1994 | Yamasaki et al. .................. 395/750 |

FOREIGN PATENT DOCUMENTS

| | | |
|---|---|---|
| 0 246 168 | 11/1987 | European Pat. Off. . |
| 0 394 098 | 10/1990 | European Pat. Off. . |

*Primary Examiner*—Gopal C. Ray
*Attorney, Agent, or Firm*—Staas & Halsey

[57] ABSTRACT

A data storage system primarily comprised of a plurality external storage units, and an interface bus to which the external storage units are connected at respective interface ports, in common with a host computer for managing the external storage units. Each of the interface ports can be changed to a high-impedance state by an external switch, before a disconnection of the related external storage unit from the interface bus.

7 Claims, 14 Drawing Sheets

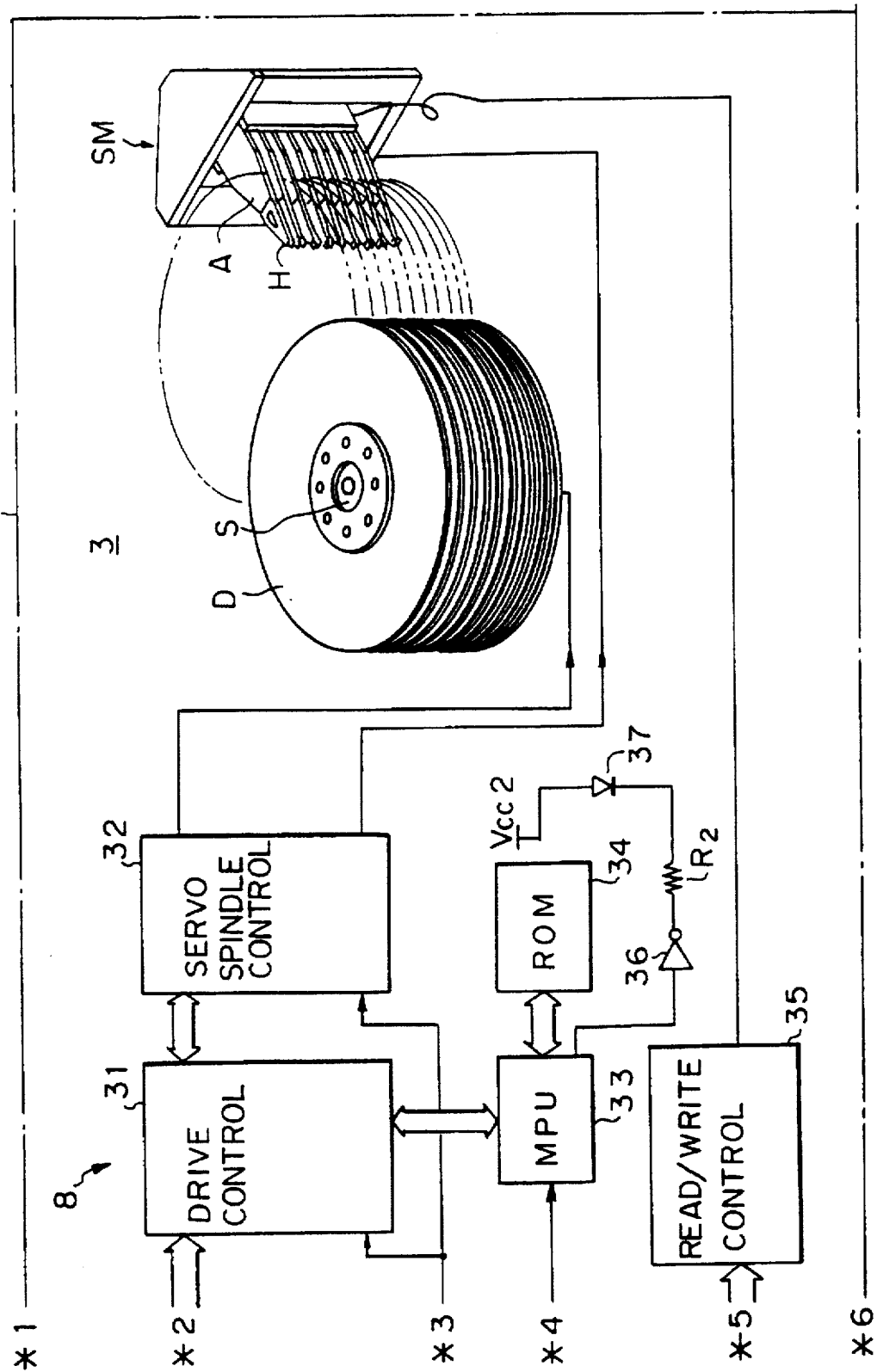

| ENB | $S_s$ | $\overline{X}$ | $S_r$ |
|---|---|---|---|
| H | L | H | L |
| H | H | L | H |
| L | X | Z | $\overline{X}$ |

| ENB | Ss | X | X̄ |
|---|---|---|---|
| H | H | H | L |
| H | L | L | H |
| L | X | Z | Z |

| RS | X - X̄ | Sr |
|---|---|---|
| H | ≧ +0.2V | H |
| H | ≦ +0.2V | L |
| L | X | Z |

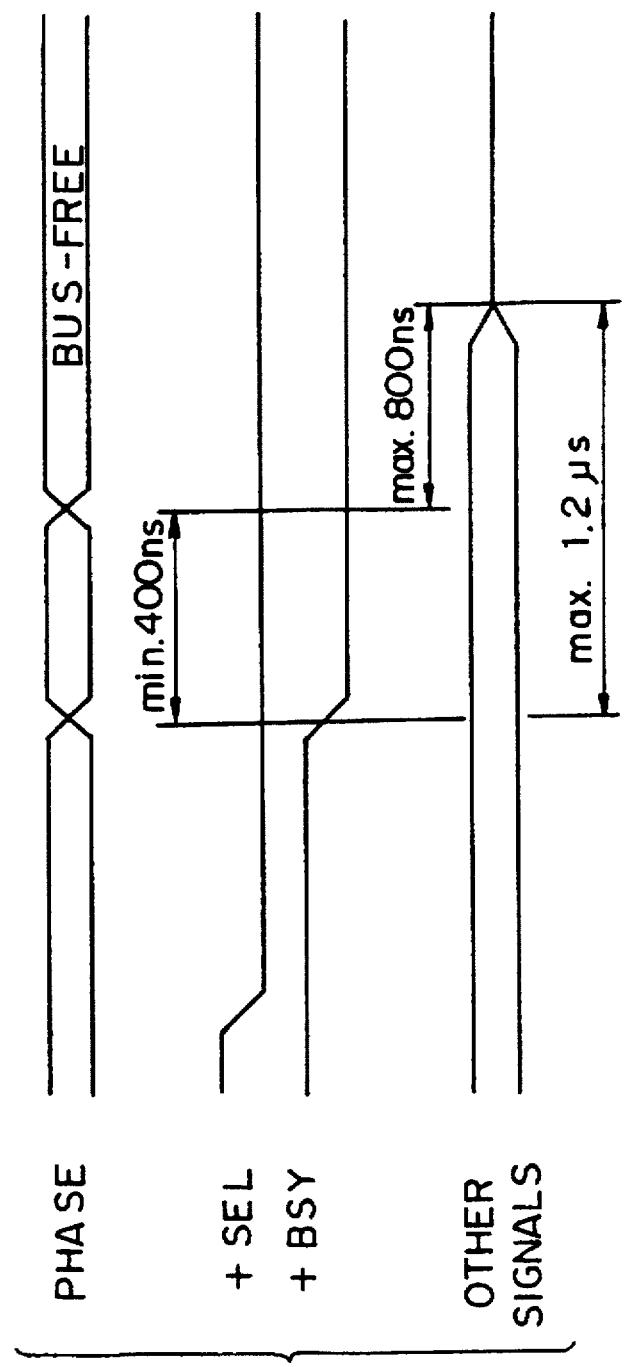

DATA STORAGE SYSTEM HAVING A DATA STORAGE APPARATUS CONNECTABLE TO A COMPUTER SYSTEM THROUGH AN INTERFACE

This application is a continuation of application Ser. No. 08/388,620, filed Feb. 17, 1995, issued on Apr. 29, 1997 as U.S. Pat. No. 5,625,777, which is a continuation of application Ser. No. 07/798,969, filed Nov. 27, 1991, which is now abandoned.

BACKGROUND OF THE INVENTION

1. Field of the Invention

The present invention relates to a data storage system having a plurality of external storage units, such as magnetic disc units, magnetic tape units and so on, and an interface bus commonly connecting the external storage units to a host computer.

2. Description of the Related Art

Recent developments in computer systems have led to demands for a higher reliability of such systems, and accordingly, it has becomes important to increase the reliability of peripheral equipment for a computer, e.g., an external storage unit such as a magnetic disc unit, magnetic tape unit and the like.

To meet this demand, a variety of external storage units having an increased reliability have been proposed, but in view of recent trends toward a continuous operating of the external storage units, day and night without stopping the system, the external storage units operate under very severe circumstances. Therefore, there in an increasing incidence of the occurrence of problems with the related units, and thus faults inevitably occur in the system.

To prevent the occurrence of such faults, and to perform necessary maintenance and inspection, a running external storage unit must be replaced with a new unit, and in this case, the related system must be disconnected as a whole from the power source, to protect data that may be lost by the power disconnection. Such a power disconnection, however, is contrary to the requirements of the above-mentioned nonstop working of the system.

Accordingly, there is a need for a way in which to replace the external storage unit without disconnecting the system power, to thereby allow a continuation of the desired nonstop operation of the system.

Currently, as mentioned above, when any one of the external storage units, such as the magnetic disc units, the magnetic tape units and so on, associated with a computer system, is to be replaced with a new unit, for a maintenance and inspection of the unit, it is necessary to disconnect the power source from the system, as a whole, before commencing the related maintenance and so on.

Practically, in a fault-tolerant computer system for a nonstop operation, day and night, the system is very reluctant to spare time for the replacement of the external storage units, since the spared time is equivalent to a wasteful waiting time for a user of the computer system, and thus it is not preferable to be able to easily disconnect the system from the power source, in view of maintaining the reliability of the nonstop operation.

The system power must be disconnected, to replace the external storage units, this must be done at night or at a time when the computer system is not processing a heavy load. This, however, limits the opportunities of achieving the above-mentioned maintenance and so on.

SUMMARY OF THE INVENTION

Therefore, an object of the present invention, in view of the above problem, is to provide external storage units, accommodated in a data storage system, that can be replaced with other units, easily and at any time, without disconnecting the system from the power source.

Another object of the present invention is to provide a storage apparatus which can be disconnected from or connected to the data storage system without stopping the supply of power to the system.

Still another object of the present invention is to provide a method of handling the external storage unit in the data storage system by which a replacement therof can be made without stopping the supply of power to the system.

To attain the above objects the external storage unit is constructed such that the unit per se is externally reset to be deenergized.

BRIEF DESCRIPTION OF THE DRAWINGS

The above object and features of the present invention will be more apparent from the following description of the preferred embodiments with reference to the accompanying drawings, wherein:

FIGS. 4A and 4B illustrate an example of an external storage unit to which the present invention is applied;

FIG. 15 is a timing chart for explaining two bus-free states.

DESCRIPTION OF THE PREFERRED EMBODIMENTS

The embodiments of the present invention will be described next with reference to the related figures.

Figure 1:
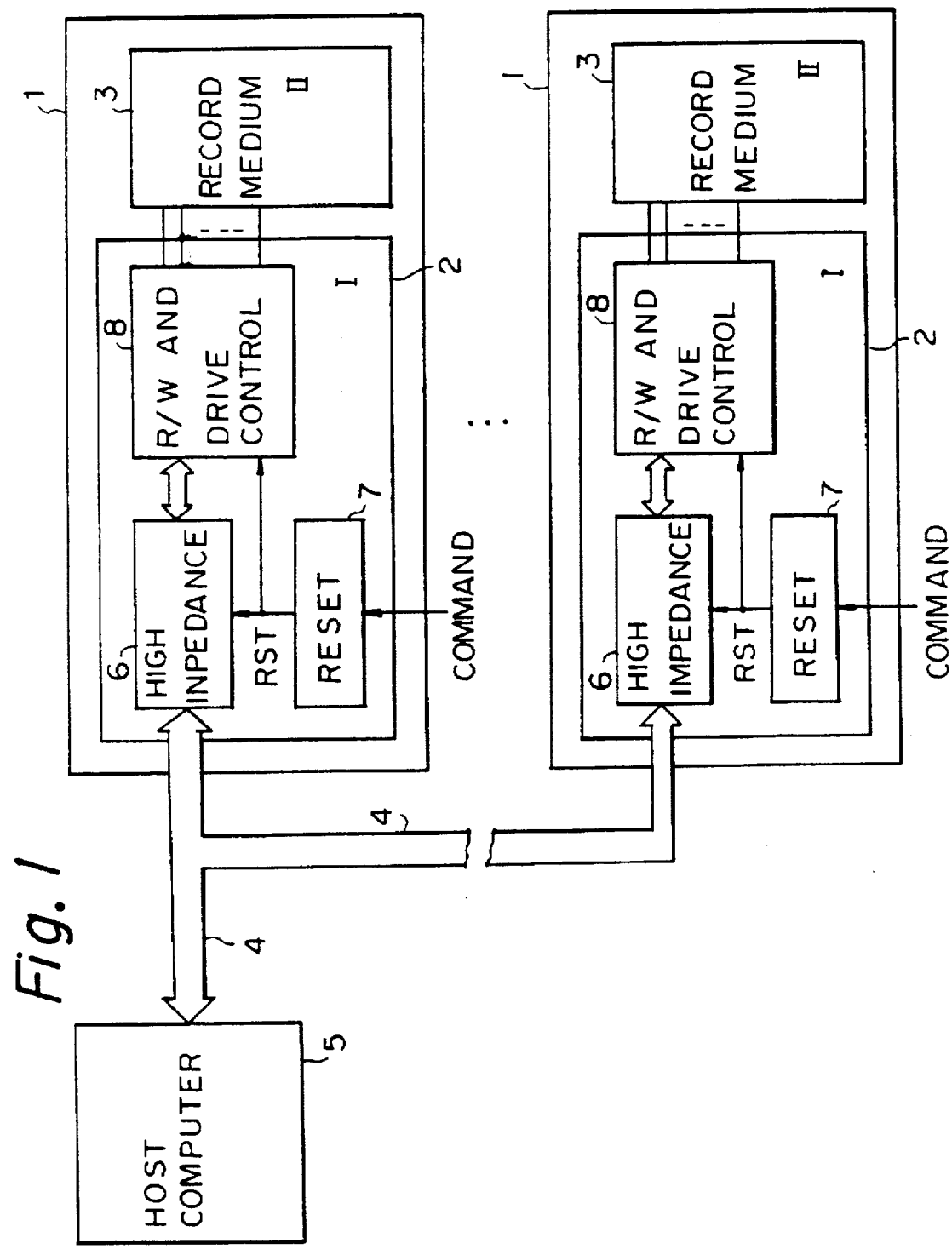
FIG. 1 is a general block diagram of the principle of a data storage system according to the present invention.

FIG. 1 is a general block diagram of a data storage system according to the present invention. In this figure, the data storage system is comprised of a plurality of external storage units 1 (two units are illustrated for brevity), an interface bus 4 and a host computer 5.

Each of the external storage units 1 has both a first sub-unit 2 and a second sub-unit 3, integrally formed as one body. The second sub-unit 3 contains at least a record medium, e.g., magnetic discs, magnetic tapes and the like, and usually contains motors for driving same. The first sub-unit 2 contains a control circuitry for controlling the record medium.

The external storage units 1 are commonly connected to the interface bus 4 at respective first sub-units 2. The host computer 5 is also connected thereto, to thereby carry out read/write operations with each of the external storage units 1.

The principle of the present invention is to enable a deactivation of each external storage unit 1 per se upon the reception thereof an external command "COMMAND". By this deactivation, a high-impedance state can be created at an interface port of the unit 1 by which the unit 1 is connected to the interface bus 4, and the second sub-unit 3 can be held in a reset state. It is, of course, possible by this deactivation, to create both the high-impedance state and the reset state, simultaneously.

The data storage system of FIG. 1 is featured by a provision of a first means 6 for selectively creating a high-impedance state with respect to the interface bus 4 in accordance with an external command "COMMAND". Preferably a second means 7 is further introduced for producing a reset signal RST by the external command "COMMAND". The reset signal RST activates the first means 2 to provide the high-impedance state. In more detail, as shown in FIG. 1, the first sub-unit 2 contains a read/write (R/W) and drive controller 8 located between the first means 6 and the second sub-unit 3.

The R/W and drive controller 8 is preferably initialized by receiving the reset signal RST from the second means 7.

Figure 2:
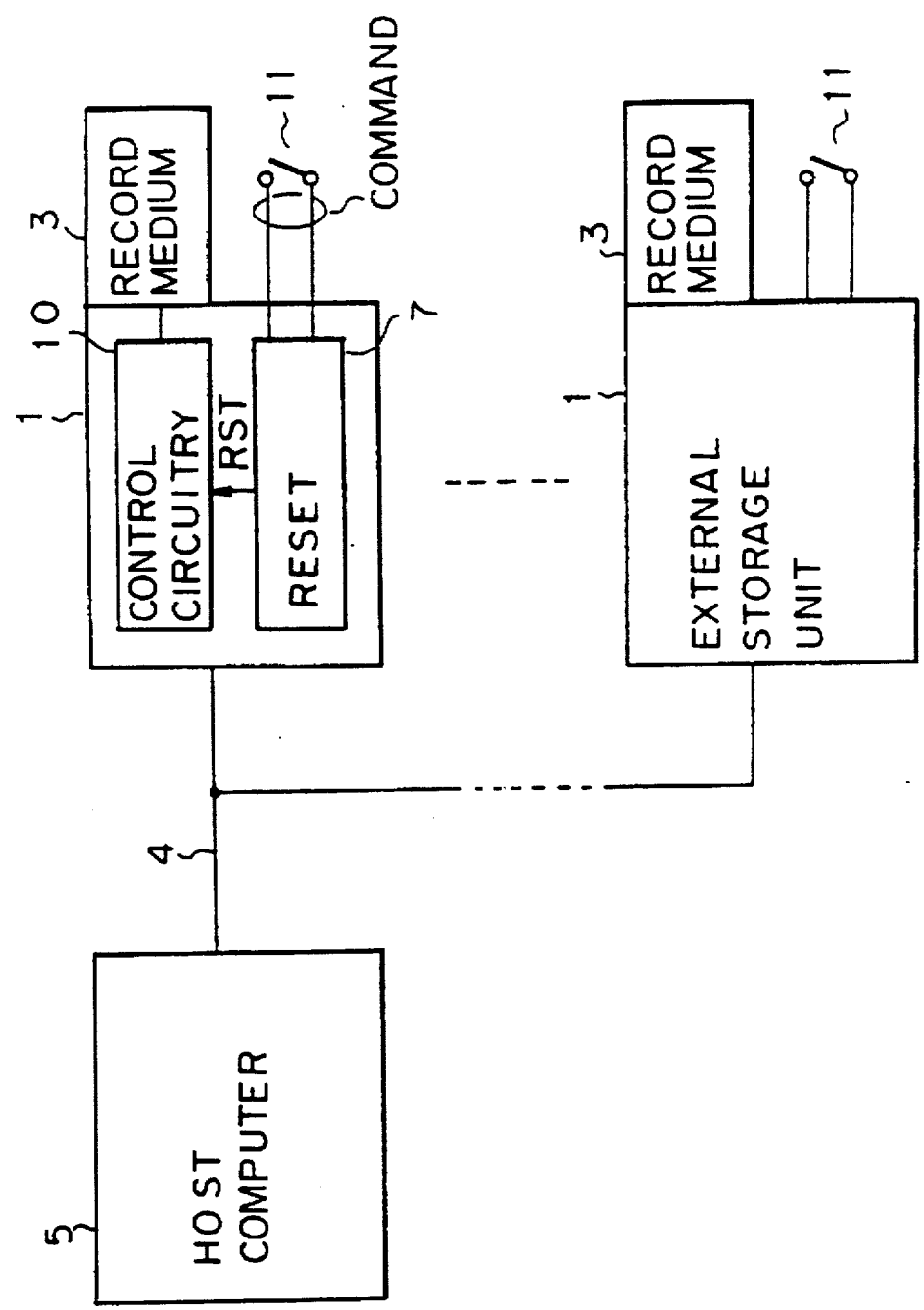
FIG. 2 is a general block diagram of a data storage system equipped with an external reset switch according to the present invention.

FIG. 2 is a general block diagram of the data storage system equipped with an external reset switch according to the present invention. Note, identical members are represented by same reference numerals or characters throughout the drawings. As seen from FIG. 2, each external storage unit is provided with an external reset switch 11 which is externally made ON or OFF, to thereby issue the aforesaid external command.

When the external reset switch 11 is made ON, the second means 7 is activated to produce the aforesaid reset signal RST, which functions to initialize the control circuitry 10 composing the aforesaid first sub-unit 2 (see FIG. 1); this reset state is maintained until the switch 11 is turned OFF.

Namely, the external reset switch 11 is constructed by a mechanical switch selectively assuming a first state and a second state, and maintaining the respective states as long as no operation to the contrary is effected. The first state is that where the external command is not issued, and the second state is that where the external command is to be issued. Specifically, the switch 11 is constructed by a lock type or latch type mechanical switch whereby, when the switch 11 is changed from the first state to the second state, the second state is mechanically held in that position.

The external storage units according to the present invention are basically operated as follows. The external storage unit 1 is usually accommodated in a locker box allotted thereto. The external reset switch 11 of the unit 1, although accommodated in the locker box, is changed to the aforesaid second state by an external operation, and this state is maintained by the latch mechanism of the switch 11. During the second state, the reset signal RST is continuously applied to the control circuitry 10, and thus the control circuitry 10 is maintained in an initial reset state. During this initial reset state, the interface port connected to the interface bus 4 is changed to the high-impedance state. Further, during this initial reset state, the motors for driving the second sub-unit (record medium) 3 are stopped by resetting a microprocessor unit (MPU); these motors being, e.g., a spindle motor and a voice coil motor. Thus, the first sub-unit 2 includes the second means 7 for stopping an activation of the second sub-unit 3 to reduce a current supply thereto, to thereby allow the external storage unit to be subsequently disconnected from the interface bus 4.

In this case, the driving of the record medium and heads H (FIG. 4B) including read/wire heads cooperating with the record medium by the second sub-unit 3 is stopping by the stopping of the activation of the second sub-unit.

Accordingly, no adverse affects can be applied. Via the interface bus 4, to the host computer 5 or to the other external storage units 1 still in use, when the external storage unit to be replaced is removed from the external storage system, due to the presence of the high-impedance state, and further, because the motors, which generally consume much power, are stopped an on-line replacement of the external storage unit can be made. Namely, the external storage unit can be replaced without disconnecting the system from the power source.

Figure 3:
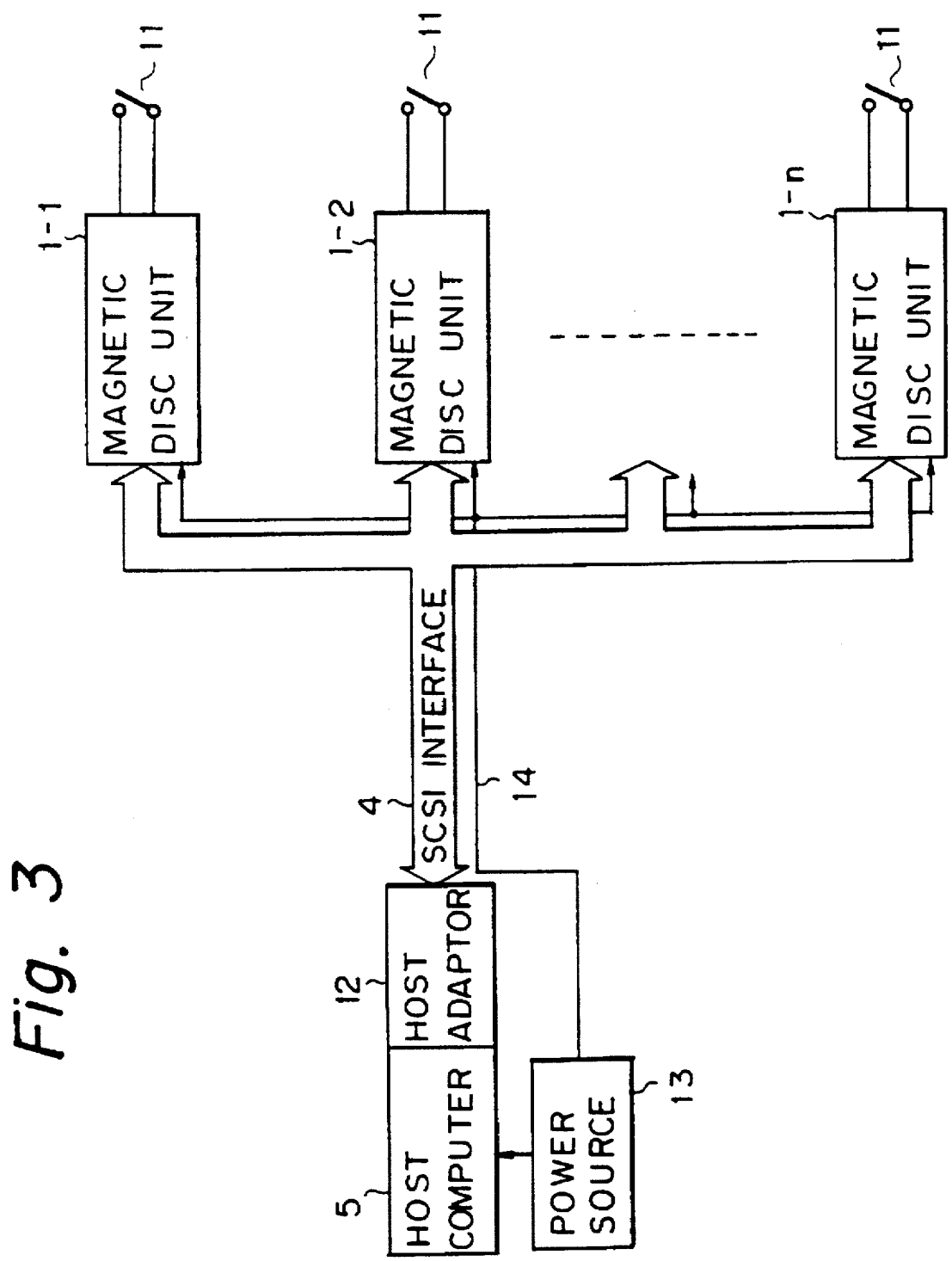
FIG. 3 is a constructional view of an external storage system including magnetic disc units, based on the construction of FIG. 2.

FIG. 3 is a constructional view of an external storage system including magnetic disc units, based on the construction of FIG. 2. A plurality of magnetic disc units 1-1, 1-2 to 1-n are connected to the host computer 5 via the SCSI (Small Computer System Interface) interface bus 4 and a host adaptor 12. The magnetic disc units 1-1 to 1-n are accommodated in respective dedicated locker boxes (not shown), in which the magnetic disc unit can be simultaneously connected with both the SCSI interface bus 4 and a power line 14, through a connector means (located at left side of each unit). The power line 14 carries power from a power source 13, i.e., power for the system.

As mentioned before, each magnetic disc unit 1 is equipped with the external reset switch 11, which can be externally operated to set the switch in a lock position (aforesaid second state). The lock position can be retained mechanically, and accordingly, when one of the units 1 is to be replaced, the switch 11 is made ON and held as it is, and then the unit is taken out of the locker box. In general, the external storage unit 1 is removed from the locker box for mounting the external storage unit therein, while maintaining the unit in a reset state created by the second means 7. The external storage unit 1 is provided with the external reset switch 11 to be operated when issuing the external command.

Figure 4A:
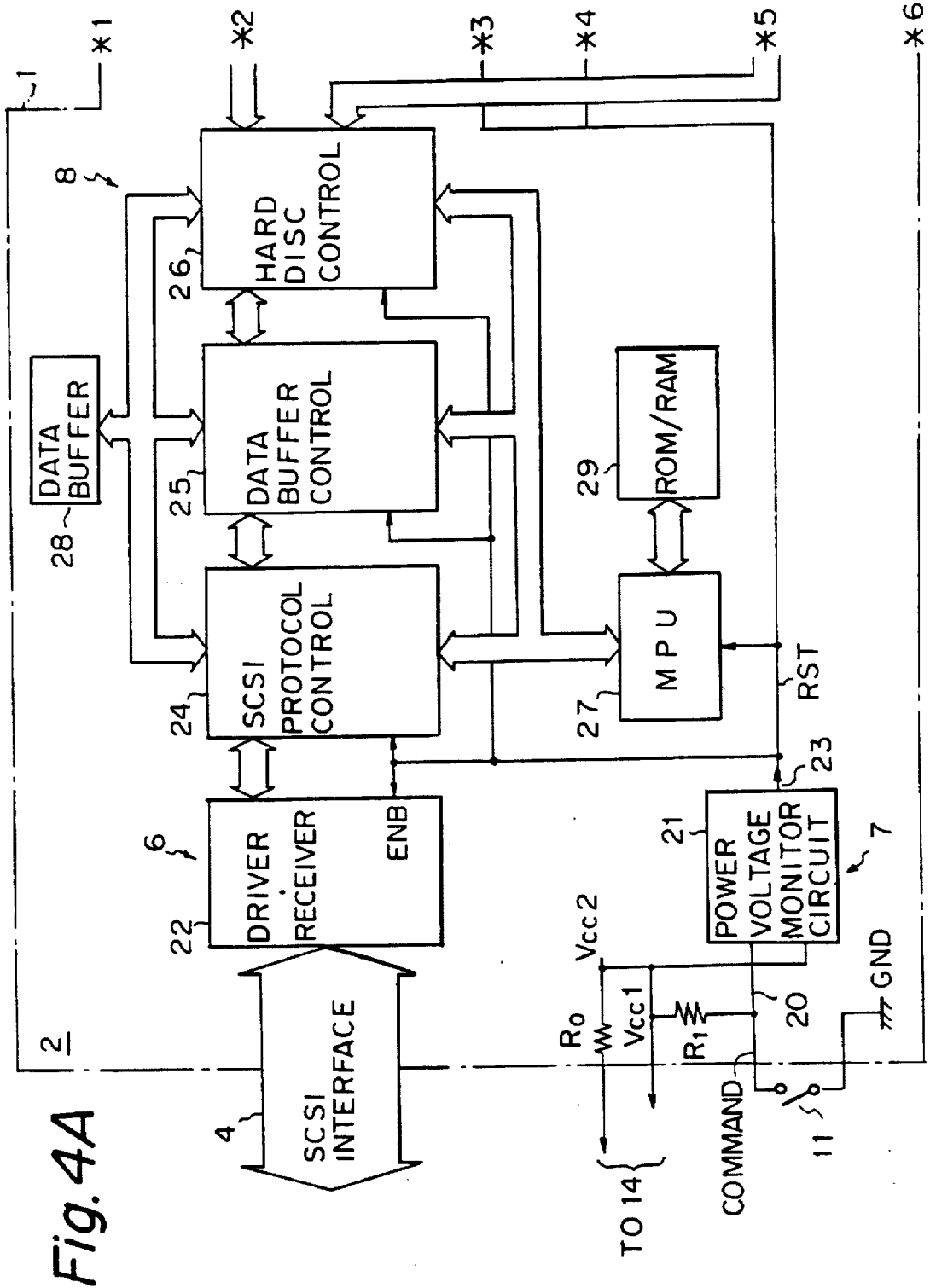

FIGS. 4A and 4B illustrate an example of an external storage unit to which the present invention is applied. In this example, the present invention is applied to a magnetic disc unit, as the aforesaid external storage unit. In FIG. 4A, the aforesaid first means 6 of FIG. 1 is realized by a driver/receiver circuit 22 in said control circuitry 10, and acts as an interface with respect to the interface bus 4.

The aforesaid second means 7 is realized by a power voltage monitor circuit 21 in the control circuitry. The power voltage monitor circuit 21 receives, at its input, a power voltage for energizing the control circuitry in the unit 1, and monitors the voltage to determine whether or not the level of the power voltage is higher than a threshold level at which a normal operation of the control circuitry is guaranteed. The power voltage monitor circuit 21 produces, at its output, the reset signal RST when the level of the power voltage is higher than the threshold level, and when the external command COMMAND is applied thereto.

The external reset switch 11 can be incorporated into the power voltage monitor circuit 21, at its input.

The aforesaid read/write and drive controller 8 of FIG. 1 is comprised of, at least, an SCSI protocol control part 24, connected to the driver/receiver circuit, for a command control of the interface bus 4, a data buffer control part 25 for controlling a transfer of the read and write data, a drive control circuit (26, 31, 32) for controlling a driving of the second sub-unit 3 of FIG. 1, at least one microprocessor unit part (27, 33) for managing these circuits, and a read/write control part 35 for controlling, in cooperation with the drive control circuit, the read/write operations of the read/write data; each of the above circuits can be initialized by the reset signal RST from the second means 7, i.e., the power voltage monitor circuit 21.

The magnetic disc unit 1 includes the second sub-unit 3 fabricated as a magnetic disc storage unit comprised of magnetic discs D for data storage, a spindle motor S for rotating same, heads H including read/write heads and a servo-head magnetically cooperating with the discs D, actuators A for moving the heads back and forth, and a servo-motor SM (called a voice coil motor) for driving the actuators. Usually the external magnetic disc unit is portable. Note, it should be understood that, in FIG. 4B, the discs D and the motor S are actually located at the positions illustrated by chain dotted lines.

As mentioned before, the magnetic disc unit is mounted in a locker box when in use, where the external reset switch 11 assumes the aforesaid first state, and the external reset switch 11 is changed to the aforesaid second state when the magnetic disc storage unit is to be removed from the locker box.

Generally speaking, the external storage unit comprises: a driver/receiver circuit 22 connected to the interface bus 4 for receiving information sent via the interface bus 4 from the host computer 5, and for sending information via the interface bus 4 to the host computer 5; a record medium for storing therein the information received through the driver/receiver circuit; a drive means connected to the record medium, for driving the record medium; a read/write means for selectively reading information from the record medium and writing information to the record medium; and the means 7 connected to the driver/receiver circuit 22 for bringing the driver/receiver circuit to a high-impedance state with respect to the interface bus 4.

The construction of FIGS. 4A and 4B will be explained below in detail. The driver/receiver circuit 22 is comprised of a pain of a driving amplifier and a receiving amplifier for each interface line composing the interface bus 4. These driving and receiving amplifiers are shown in later figures.

The SCSI protocol control part 24 can be realized by a product MB87033 or MB652012u from Fujitsu Co. Ltd. The data buffer control part can be realized by a product MB650535 from Fujitsu Co. Ltd. The hard disc control part can be realized by a product MB651198 from Fujitsu Co. Ltd. The SCSI protocol control circuit 24, the data buffer control circuit 25, and the hard disc control circuit 26 are controlled by the microprocesor unit (MPU) 27, and commonly share a data buffer 28. The MPU 27 can be realized by a product MC68000 from the Motorola Co. Ltd., and cooperates with a ROM/RAM 29.

The drive control circuit 31 can be realized by a product MB660506u, controlled by a microprocessor unit (MPU) 33 and cooperating with an ROM 34. The MPU 33 can be realized by a product 80C196 from Intel Co. Ltd. The MPU 33 and the MPU 27 may be realized by a single MPU, if necessary.

The servo/spindle control part 32 can be realized by products MB43830 through 43834 and MB43836 from Fujitsu Co. Ltd.

The read/write control part 35 can be realized by a product 32D536 from Silicon Systems Incorporated.

Details of the major inside circuitry of the unit 1 in FIGS. 4A and 4B have been given in "M2261S/H, M2262S/H, M2263S/H, INTELLIGENT DISK DRIVERS CE MANUAL" published by Fujitsu Co. Ltd., in May 1990.

The second means 7 is set up by the voltage power monitor circuit 21, which can be realized by a product MB3771 from Fujitsu Co. Ltd. The MB3771, i.e., the power voltage monitor circuit 21, is a power-on reset circuit. The circuit 21 receives two power voltages, $V_{cc1}$ and $V_{cc2}$, to produce the reset signal RST on a line 23 until both the voltages $V_{cc1}$ and $V_{cc2}$ become higher than a predetermined threshold level ($V_{th}$) from the time at which the power was supplied. The reset signal RST, given immediately after the supply of the power, is applied to the driver/receiver circuit 22, the SCSI protocol control circuit 24, the data buffer control circuit 25, the hard disc control circuit 26, the MPU 27, the drive control circuit 31, the servo/spindle control circuit 32, and the MPU 33, to bring these circuits respectively to the initial reset state. In the initial reset state, the spindle motor S and the servo-motor SM are stopped, not driven.

An input line 20 of the power voltage monitor circuit 21 is pulled up, via a current limiting resistor $R_1$, to the level of $V_{cc1}$. The external reset switch 11 according to the present invention is newly connected between the input line and the ground GND.

The use of the two power voltages $V_{cc1}$ and $V_{cc2}$ is not essential to the present invention, but is inherent to the aforesaid MB3771. When these voltages $V_{cc1}$ and $V_{cc2}$ are normally supplied, i.e., are higher than the threshold level ($V_{th}$), and if the external reset switch 11 is made ON, the input line 20 is grounded via the now conductive switch 11. Accordingly the power voltage $V_{cc1}$ is reduced to zero volt; i.e. the $V_{cc1}$ becomes lower than the threshold level ($V_{th}$). In this condition, the reset signal RST is continuously output on the line 23.

The power voltages $V_{cc1}$ and $V_{cc2}$ are supplied from the power line 14 via the aforesaid connector means while both are at the same voltage level. When the connector means is coupled, the voltage $V_{cc2}$ is first applied and then the voltage $V_{cc1}$. Such a sequential supply of the voltages $V_{cc2}$ and $V_{cc1}$ can be realized by making the length of the related connector pins different from each other, as schematically illustrated by a long arrow and short arrow at the bottom left of FIG. 4A. Namely, the connector pin of the voltage $V_{cc1}$ is short and the connector pin of the voltage $V_{cc2}$ is long. The reason for this sequential supply of the voltages is as follows. First, the source power is received through a rush current protection resistor $R_0$, and thus a lower voltage $V_{cc2}$ is obtained. Soon there after, the source power is fully received without the intervention of the resistor $R_0$, and thus a full voltage $V_{cc1}$ is obtained. This also enables a generation of the reset signal for a predetermined constant time.

Figure 5:
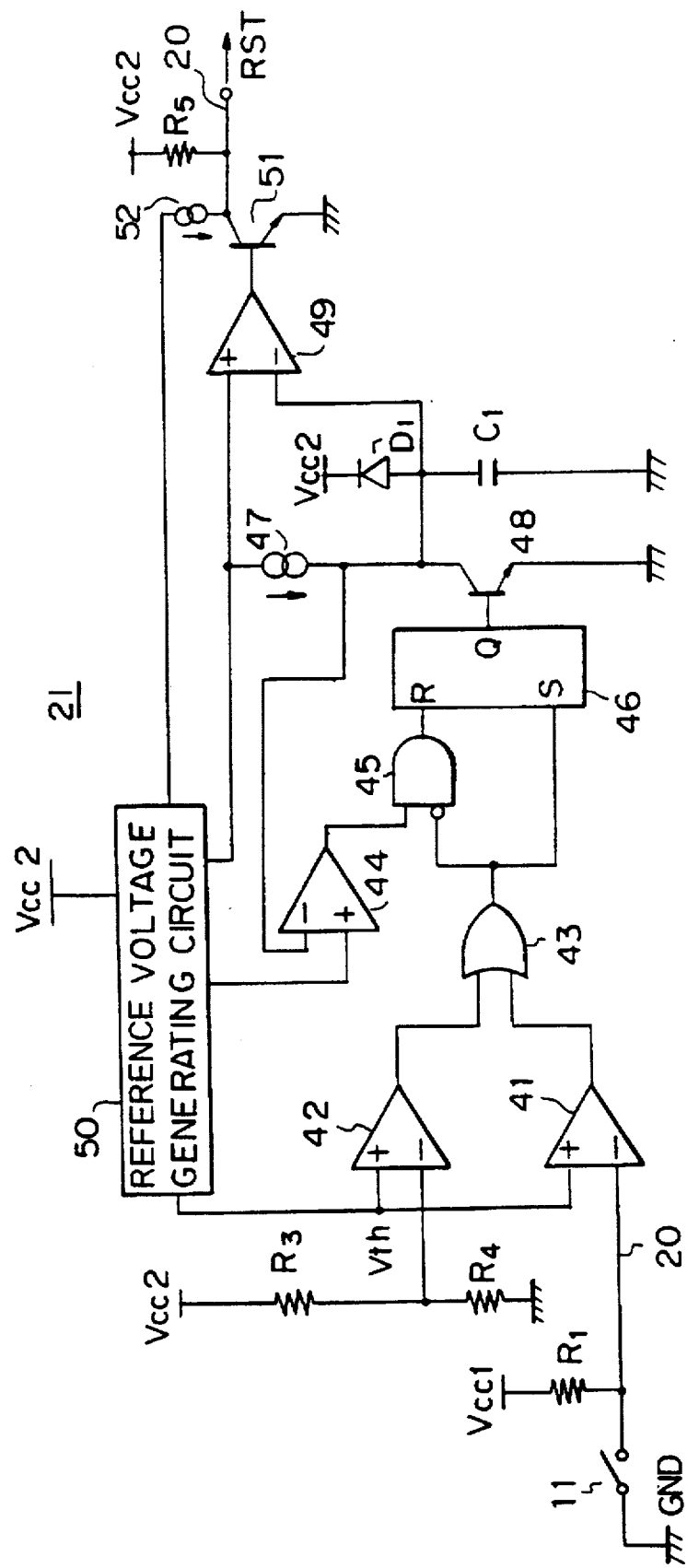
FIG. 5 is a circuit diagram of an example of the power voltage monitor circuit.

FIG. 5 is a circuit diagram of an example of the power voltage monitor circuit. The power voltage monitor circuit 21 incorporates therein the external reset switch 11 according to the present invention. The power voltage monitor circuit 21 is comprised of at least one comparator (41, 42) receiving the threshold level $V_{th}$ at one input thereof, and being connected to, via a resistor ($R_1$, $R_3$, $R_4$), the power source at the other input thereof; the latter input is also connected in series with the external reset switch 11 and is grounded, when the external reset switch 11 is operated, to produce the reset signal RST from the output of the comparator. As mentioned above, the use of the two voltages $V_{cc1}$ and $V_{cc2}$ is not essential to the present invention. Namely, it is enough to use either one of the comparators 41 and 42, although in the example two comparators 41 and 42 are used to receive the voltages $V_{cc1}$ and $V_{cc2}$, respectively. In the figure, reference numerals 44 and 49 are also comparators, 43 represents an OR circuit, 45 an AND circuit, 46 a flip-flop circuit, 47 a constant current source, 48 a transistor, 50 a reference voltage generating circuit, 51 a transistor, and 52 a constant current source. The operation of this circuit will be explained below.

When the external storage unit (magnetic disc unit) 1 is in normal use, the comparator 41 produces the output "0", since the voltage $V_{cc1}$ is higher than the threshold level $V_{th}$. The comparator 42 also produces the output "0", since the voltage $V_{cc2}$ divided by the resistors $R_3$ and $R_4$ is higher than the threshold level $V_{th}$. Accordingly, the AND circuit 43 produces the logic "0", and thus the R-S flip-flop 48 remains in the reset state, and therefore, the flip-flop 48 hold the state of the transistor 48 unchanged and the transistor 48 is held OFF. A capacitor $C_1$ is charged by the constant current source 47, and thus the comparator 49 produces the output "0" because the charged voltage at $C_1$ is higher than the threshold level $V_{th}$, which holds the transistor 51 OFF. Accordingly, the reset signal RST now "1" is not active. Note, the reset signal RST is active at the low level "0". Further note, a diode $D_1$ is used as the level shifter, and the comparator 44 produces the output "1" for as long as the $V_{cc2}$ is normally applied.

The present invention functions as follows. First, the external reset switch 11 is made ON, before the removal of the related external storage unit 1 from the data storage system. The turning ON of the switch 11 causes the voltage $V_{cc1}$ applied to the comparator 41 to become 0 volt, and therefore, the output of the comparator 41 is changed from "0" to "1". Due to this change, the output of the OR circuit 43 is changed to "1", whereby the R-S flip-flop 46 is set to produce a logic "1" from the Q-output. Thereof, and thus the transistor 48 is turned ON. Then the capacitor $C_1$ starts a discharge through the now ON transistor 48, and after an elapse of a predetermined time, the charged voltage of $C_1$ becomes lower than the threshold level $V_{th}$ applied to the comparator 49, and thus the output of the comparator 49 is changed from "0" to "1", whereby the transistor 51 is turned ON. Accordingly, the reset signal RST becomes active at a low level "0", to thereby initialize the control circuitry in the first sub-unit 2 (see FIG. 4A). A replacement of the external storage unit in the initialized state has no adverse affect on the host computer 5 and other external storage units 1.

When another external storage unit 1 is newly incorporated into the data storage system, the external reset switch 11 thereof is still maintained ON, and after the connection of the new external storage unit 1 to the system is completed, the reset switch 11 is then turned OFF. Accordingly, the output of comparator 41 changed from "1" to "0", and therefore, the output of the OR circuit returned from "1" to "0". Therefore, the output of the AND circuit 45 is changed from "0" to "1", to thereby reset the R-S flip-flop 46, and the Q-output thereof, and thus the transistor 48 is turned OFF. When the transistor 48 is turned OFF, the capacitor $C_1$ is charged, and after an elapse of the predetermined time, the charged voltage becomes higher than the threshold level $V_{th}$ at the comparator 49, and thus the output of the comparator 49 is changed to "0" and the transistor 51 is turned OFF. As a result, the reset signal RST is returned is "1" and becomes nonactive, whereby the initial reset state is released.

In more detail, the above operation is carried out as follows. When the new magnetic disc unit 1 is accommodated in the locker box, a power supply to the unit 1 is applied through the aforesaid connector means. As mentioned previously, the power supply is carried out sequentially, and thus, the $V_{cc2}$ is applied, and then the $V_{cc1}$. During the first supply of $V_{cc2}$, the reset signal RST ("0") is produced, which is equivalent to a case where the external reset switch 11 is made ON. Thereafter, the voltage $V_{cc1}$ is supplied, by which the reset signal is released ("1"); this is equivalent to a case where the external reset switch 11 is made OFF.

Figures 6, 7:
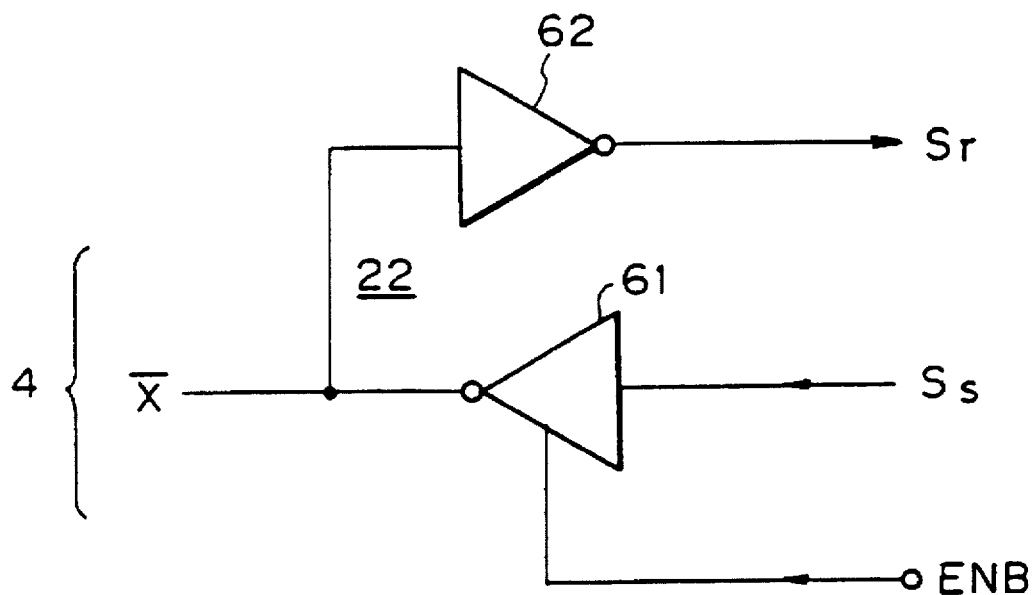
FIG. 6. is a diagram showing a first example of the driver/receiver circuit.
FIG. 7 is a truth value table specifying an operation of the circuit shown in FIG. 6.
Figures 8, 9A, 9B:
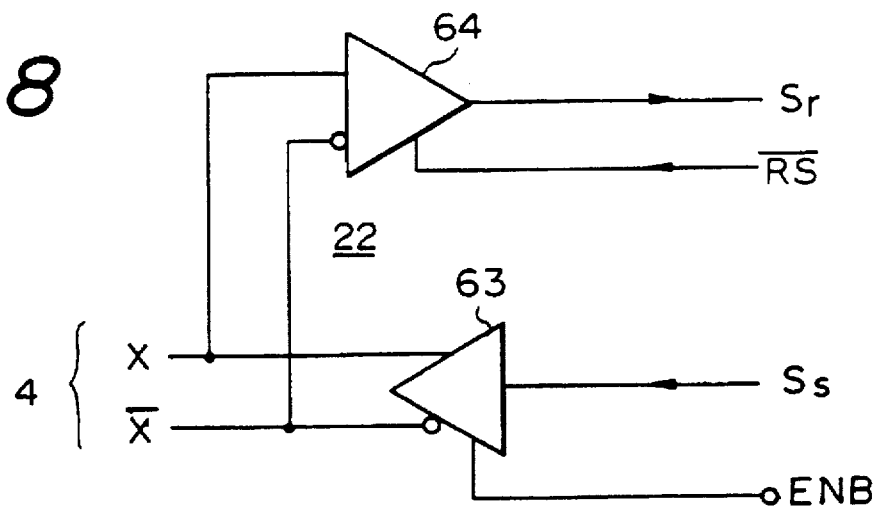
FIG. 8 is a diagram showing a second example of the driver/receiver circuit.
FIGS. 9A and 9B are truth tables specifying an operation of the circuit shown in FIG. 8.

FIG. 6 is a diagram showing a first example of the driver/receiver circuit, FIG. 7 is a truth value table specifying an operation of the circuit shown in FIG. 6, FIG. 8 is a diagram showing a second example of the driver/receiver circuit, and FIGS. 9A and 9B are truth tables specifying an operation of the circuit shown in FIG. 8.

Referring to these figures, the driver/receiver circuit 22 in FIG. 4A is comprised of a pair of a driving amplifier (61, 63) and a receiving amplifier (62, 64). The driving amplifier sends signals $S_s$, to the host computer 5 via the interface bus 4, and the receiving amplifier receives signals $S_r$, from the host computer 5, via the same. The driving amplifier has an input terminal, an output terminal and an enable terminal ENB. The enable terminal ENB receives the reset signal RST, to bring the output terminal to the high-impedance state.

Note, the pair of amplifiers 61 and 62 are connected to each line of the interface bus 4, and this also applied to the amplifiers 63 and 64.

In FIG. 6, the driving amplifier 61 receives the send signal $S_s$ from the read/write and drive controller 8 (FIG. 1 and FIG. 4A) and outputs an interface signal $\overline{X}$ to the SCSI interface bus 4. The interface signal $\overline{X}$ from the SCSI interface bus 4 is applied to the receiver amplifier 62, to obtain the receive signal $S_r$ having a shaped waveform. The signal $S_r$ is supplied to the read/write and drive controller 8. It is important to note that the driving amplifier is controlled by an enable signal applied to the enable terminal ENB.

The driving and receiving amplifiers 61 and 62 are constructed as imbalance type amplifiers, and each selectively assumes three states; this is called a tri-state. The driving amplifier 61 assumes various truth values as shown in the table of FIG. 7. In the table, H (high) represents the logic "1", L (low) represents the logic "0" and Z represents the high-impedance state, which is important to the present invention, wherein the reset signal RST activated at a low level.

When the power voltage monitor circuit 21 produces the reset signal RST, which is active at a low level "0", the signal RST is applied to the enable terminal ENB, and thus the driving amplifier 61 produces the interface signal $\overline{X}$ in the high-impedance (Z) state. Note, under the high-impedance state the receive signal $S_r$ depends on the signal $\overline{X}$ per se.

Referring to FIG. 8, the driving amplifier 63 outputs the interface signals X and $\overline{X}$ to the SCSI interface bus 4, and the receiving amplifier 64 receives the interface signals X and $\overline{X}$ from the SCSI interface bus 4; these signals X and $\overline{X}$ having a shaped waveform to obtain the receive signal $S_r$. The driving amplifier 63 is controlled by an enable signal applied to the enable terminal ENB, and a similar signal is applied, as a reset signal $\overline{RS}$, to the receiving amplifier 64.

The driving and receiving amplifiers 63 and 64 are constructed as differential type amplifiers or balance type amplifiers, and these amplifiers assume various truth values as shown in the tables of FIGS. 9A and 9B. The meanings of the characters are the same as explained in FIG. 7. Note, the SCSI interface bus for accepting the amplifiers 61 and 62 has a different structure to that of the interface bus for accepting the amplifiers 63 and 64.

When the power voltage monitor circuit 21 produces the reset signal RST and applies same to the enable terminal ENB, the related enable signal becomes "0" (L), and thus the interface signals X and $\overline{X}$ having the high-impedance (Z) are produced by the driving amplifiers 63.

As mentioned above, the driving amplifier (61, 63) produces, upon receipt of the reset signal RST "0", the signal X or the signals X and $\overline{X}$ having the high impedance Z. Consequently, the SCSI interface bus 4 does not suffer from an adverse affect of a disconnection between the bus 4 and the unit 1, since the high-impedance state at the interface port of the unit 1 isolates the connection there between.

Note, in FIG. 8, since the high impedance state concerns only the driving amplifier 63 and the enable terminal ENB, the $\overline{RS}$ terminal of the other amplifier 64 need to be set only in a pull up state.

The above-mentioned high-impedance state will be explained in more detail below. If the interface signal from the driver/receiver circuit 22 is not a high impedance (Z) signal, the send signal $S_s$, is directly output as is to the interface bus 4, as the interface signals X and $\overline{X}$ in the case of, e.g., FIG. 8. Accordingly, undesirable affects may occur in the send signal $S_s$, at the removal of the magnetic disc unit 1 from the interface bus 4. The faulty send signal $S_s$, is then sent to the SCSI interface bus 4, and may induce a malfunction in the sequence to be performed thereon. In the worst case, the malfunction causes a nonoperational state such as a bus hang-up, etc. Nevertheless, in the present invention the interface signal from the driver/receiver part 22 is transformed to the high-impedance (Z) state every time the unit 1 must be replaced, and thus such a bus hang up and the like does not occur. For example, referring again to FIG. 3, where the magnetic disc unit 1-2 is not supplied with power, the driver/receiver part 22 therein is not energized, and therefore, the circuit 22 provides the high-impedance state. In this case, the bus sequence on the SCSI interface 4 can be normally performed for the host computer 5 and other active magnetic disc units 1-1 and 1-3 through 1-n.

Contrary to the above, where the magnetic disc unit 1-2 is supplied with power, as usual, but other units 1-1 and 1-3 through 1-n including the host computer 5 communicate only with each other via the interface bus 4 (the unit 1-2 is free), if the unit 1-2 is to be replaced, it is necessary to stop the power supply to the unit 1-2. When the power supply is stopped, the driver/receiver unit 22 in the unit 1-2 is not supplied with power. Therefore, due to the influence of a transient response at the stopping of the power supply, undesired noise or faults may be caused by the driver/receiver circuit 22 of the unit 1-2, and applied to the SCSI interface bus 4. The noise, etc., will further cause undesired malfunctions of the bus sequence on the active SCSI interface 4, which lead to a bus hang-up, etc.

According to the present invention, as mentioned above, the reset signal RST is continuously supplied by the external reset switch 11 to the control circuitry of the unit 1-2, and thus the high-impedance state of the driver/receiver circuit 22, at the interface port thereof, is always maintained, and this enables an on-line removal of the unit 1-2 from the interface bus 4.

Further, the driving of the servo-motor (voice coil motor) and the spindle motor is also stopped by the reset signal RST, and therefore, the power consumption, i.e., the power load, is greatly reduced. Under such a light power load, a penetration of noise through the power lines into other elements (4, 5, 1) cannot occur. Where, for example, DC+12V and DC+5V are used as the standard system power of the external magnetic disc storage system, the DC+12V is usually used for driving the aforesaid motors S and SM, and the DC+5V is usually used for the aforesaid driver/receiver circuit 22 and other logic and analog circuits. In the above system, when a magnetic disc unit 1 is to be removed for a replacement, the external reset switch 11 is used, to prevent noise from entering the common power system of DC+5V, since the power load of DC+12V for the unit 1 is reduced by the signal RST, and to inhibit noise from entering the interface bus 4 due to high-impedance (Z) caused by the signal RST.

Figure 10:
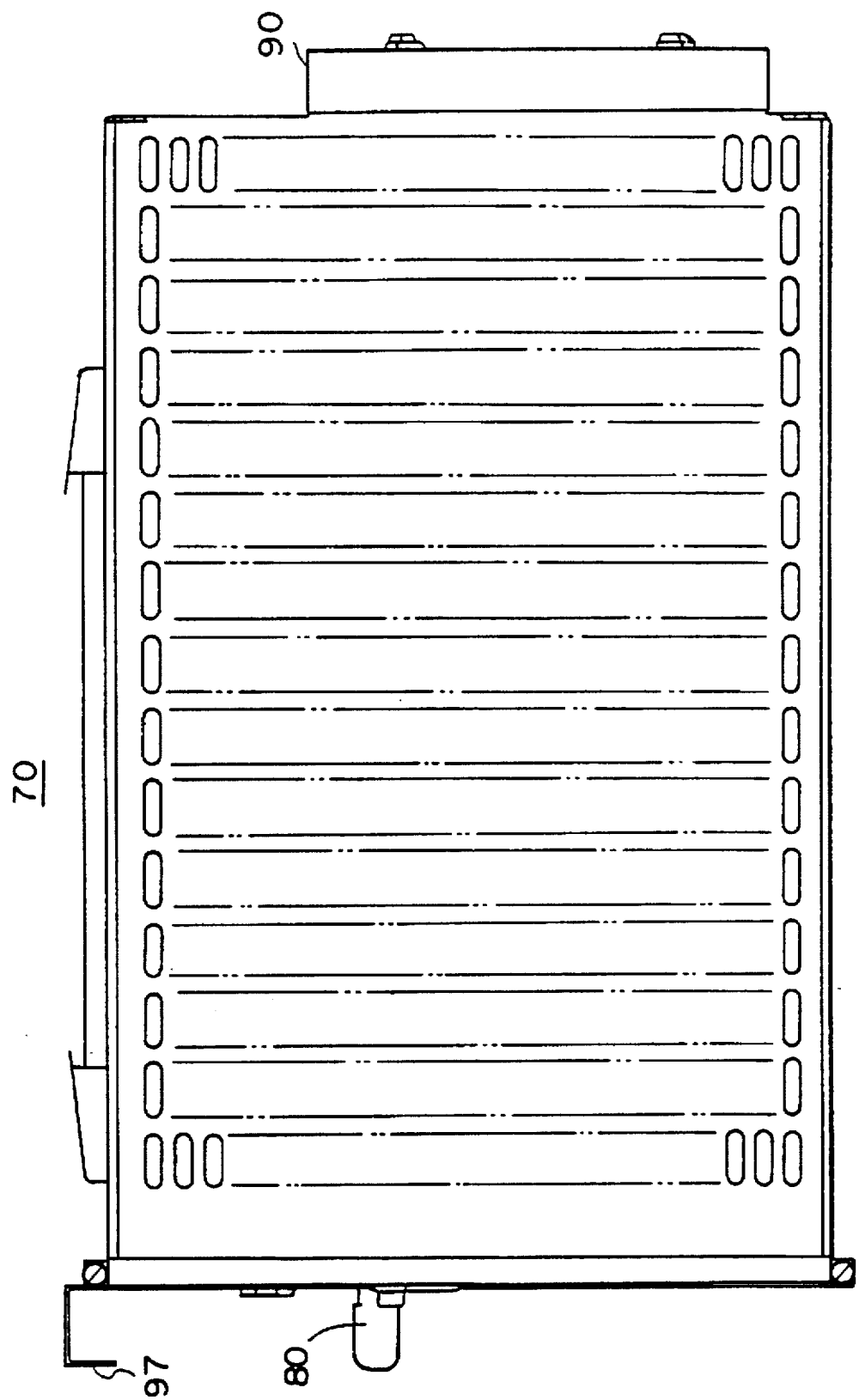
FIG. 10 is a side view of the magnetic disc unit.
Figure 11:
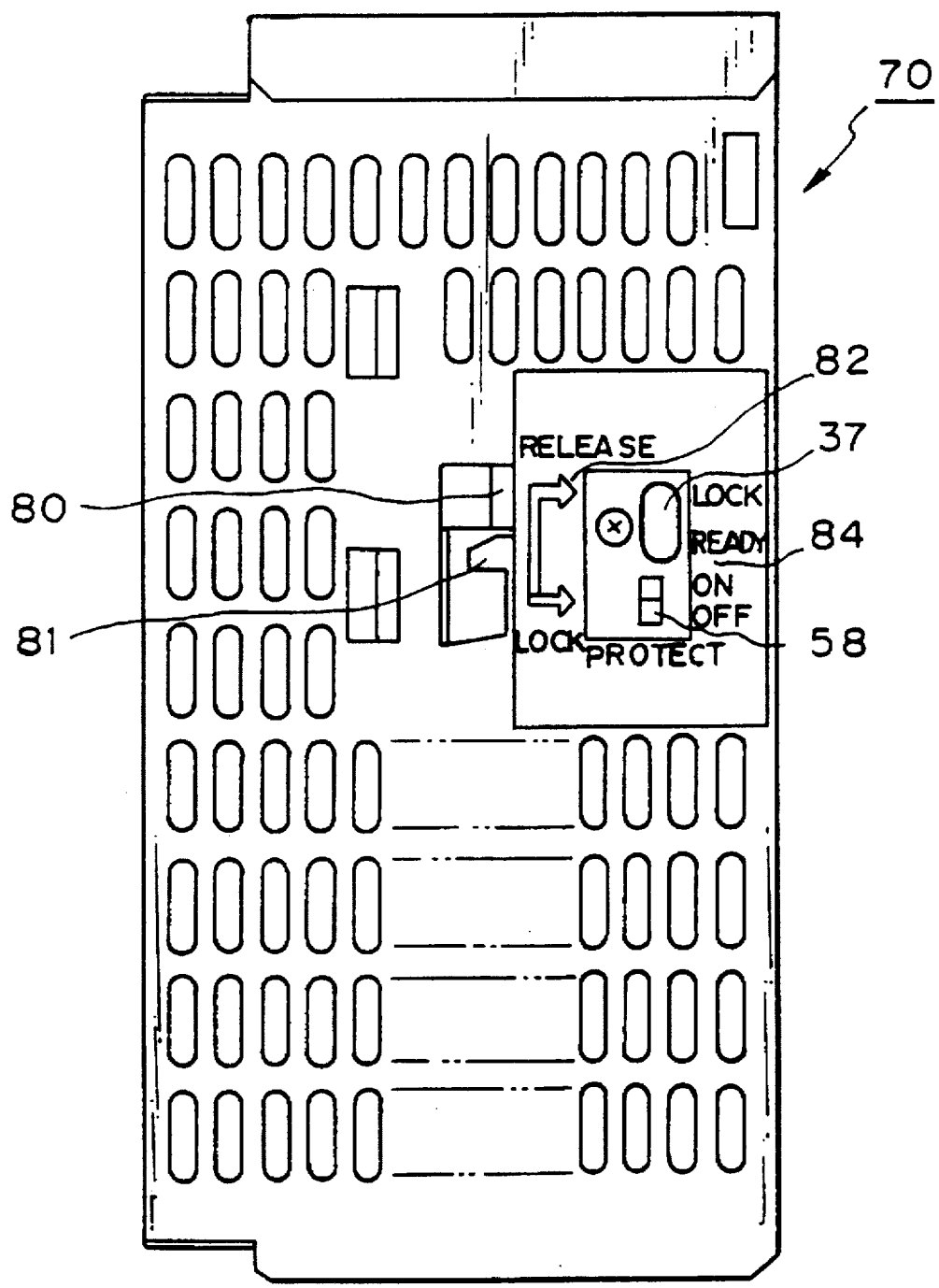
FIG. 11 is a front view of the magnetic disc unit.
Figure 12:
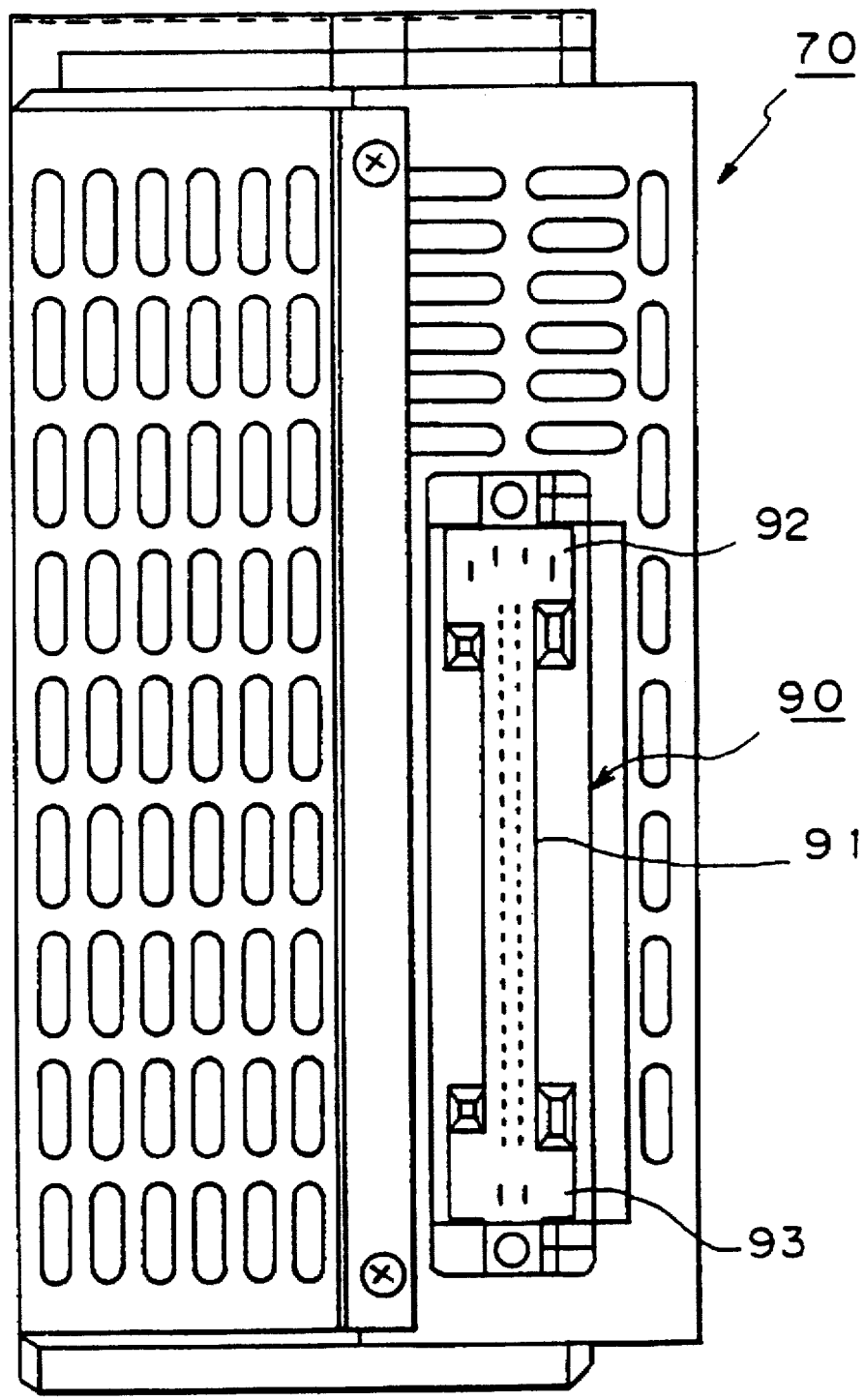
FIG. 12 is a rear view of the magnetic disc unit.

FIG. 10 is a side view of the magnetic disc unit, FIG. 11 is a front view of the magnetic disc unit and FIG. 12 is a rear view of the magnetic disc unit.

In these figures, the surface of a housing 70 of the magnetic disc unit has a plurality of openings for heat radiation, as illustrated by oval-shaped holes, and the external reset switch 11 (not shown) is actuated by a knob 80. The switch 11 is maintained OFF when the knob 80 is in the position illustrated in FIGS. 10 and 11, but as shown in FIG. 11, if the knob 80 is first shifted left to move away a locking projection 81, and then pushed downward, as a slide switch, the knob 80 is then in the position at which the reset switch 11 is made ON.

Note, label (82) indicating "RELEASE" and "LOCK" is located at the side of the knob 80. Further an indication lamp (37) showing the "LOCK" and "READY" states is mounted at the side of the knob 80. The indication lamp 37 is shown in FIG. 4B, and is turned ON during a "READY" state of the microprocessor 33 (FIG. 4B), and flashes when the discs D are accessed by the host computer 5 (FIG. 3). Thus, if the indication lamp 37 is turned OFF, this means that the related disc unit is in neither an access state nor a ready state. The lamp 37 is driven through an invertor 36 and a resistor $R_2$ of FIG. 4B. Reference numeral 84 represent a knob of a write-protection switch. The protection switch 84 is operated to set a mode wherein only a read operation is permitted.

Referring to FIG. 12, a connector 90 is mounted at the rear of the unit 0. This connector 90 is the connector means referred to hereinbefore. The center side two columns of the connector 90 are connection pins 91 by which the disc unit is connected to and disconnected from with the SCSI interface bus 4. The upper side four pins 92 are connection pins for carrying the aforesaid voltages $V_{cc1}$ and $V_{cc2}$, and the bottom side two pins 93 carry a voltage $V_{cc3}$ corresponding to the aforesaid DC+12V; both the $V_{cc1}$ and $V_{cc2}$ correspond to the aforesaid DC+5V.

The aforesaid locker box is equipped with a reception point (not shown) enabling a coupling with the unit shown in FIGS. 10, 11 and 12. When the unit is inserted to the locker box, the connection between the unit and the SCSI interface bus 4 is completed at the connector 91.

As understood from FIG. 11 and the above explanation, the knob 80 and the locking projection 81 form an autolock mechanism, together with the aforesaid reception point of the corresponding locker box. Thus, each magnetic disc storage unit 1 is equipped with an autolock mechanism engaging the locker box, and a knob 80 for actuating the external reset switch 11. The autolock mechanism functions such that the magnetic disc storage unit cannot be removed from the locker box without shifting the knob to a position at which the external reset switch 11 is in the aforesaid second state wherein the external command (reset signal RST) is generated.

Further the magnetic disc storage unit 1 is equipped with the conductive connector 90, which is detachably electrically engaged with another connector at the locker box side. These connectors carry the interface bus signal and the power source.

In general, the external storage unit comprises: the connector 90 for receiving a DC power from the host computer 5 side; the driver/receiver circuit 22 connected to the interface bus 4 for receiving information sent via the interface bus 4, from the host computer 5, and for sending information via the interface bus 4 to the host computer 5; the record medium for storing therein the information received through the driver/receiver circuit; the drive means connected to the record medium, for driving the record medium; the read/write means for selectively reading information from said record medium and writing information to the record medium; the control circuitry 10, connected to the driver/receiver circuit 22 and to both the drive means and the read/write means and including at least one microprocessor (27, 33) to which a command is sent from the host computer 5 to control both the drive means and the read/write means; the reset circuit 7 for detecting the DC power supplied from the connector 90, and when the level of the detected DC power reaches a predetermined threshold level, producing the reset signal for initializing the control circuitry 10; and a means connected to the reset circuit 7 for compulsorily generating the reset signal regardless of the detection by the reset circuit of the DC power.

The above mentioned autolock mechanism will be described in more detail with reference to the related figures.

Figure 13A:
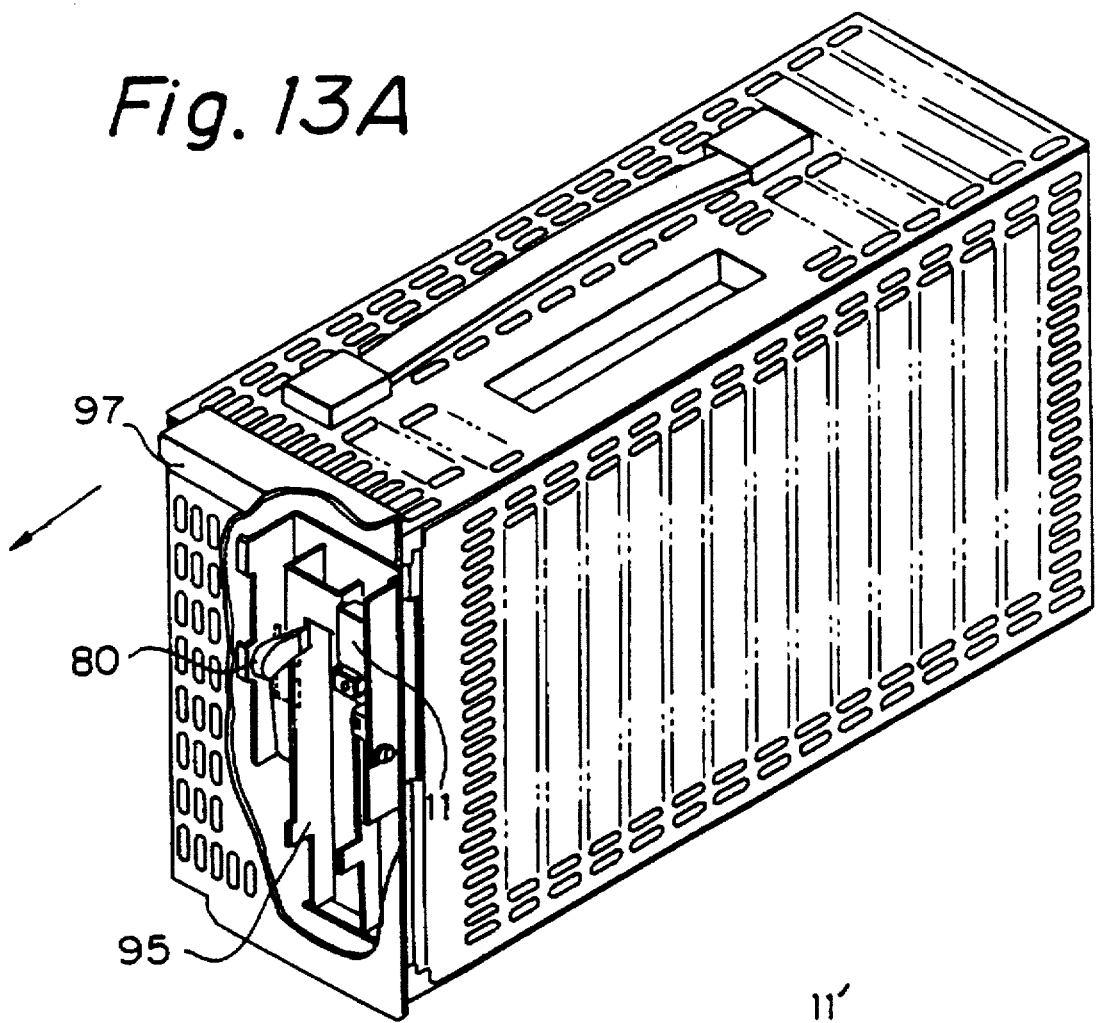
FIG. 13A is a full perspective view showing a release mode of the autolock mechanism.
Figure 13B:
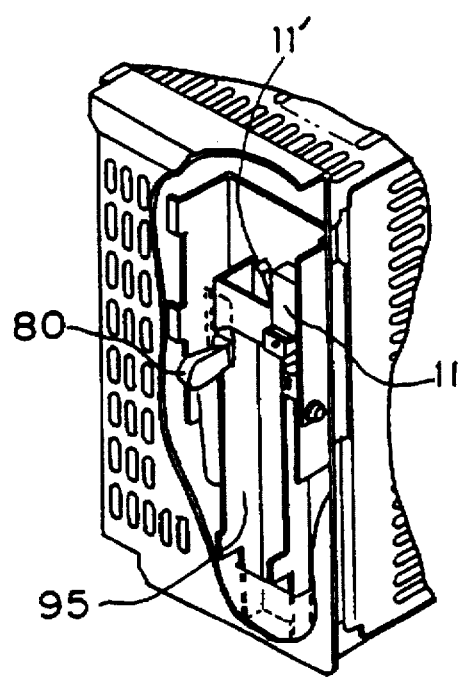
FIG. 13B is a partial perspective view showing a lock mode of the autolock mechanism.
Figure 14:
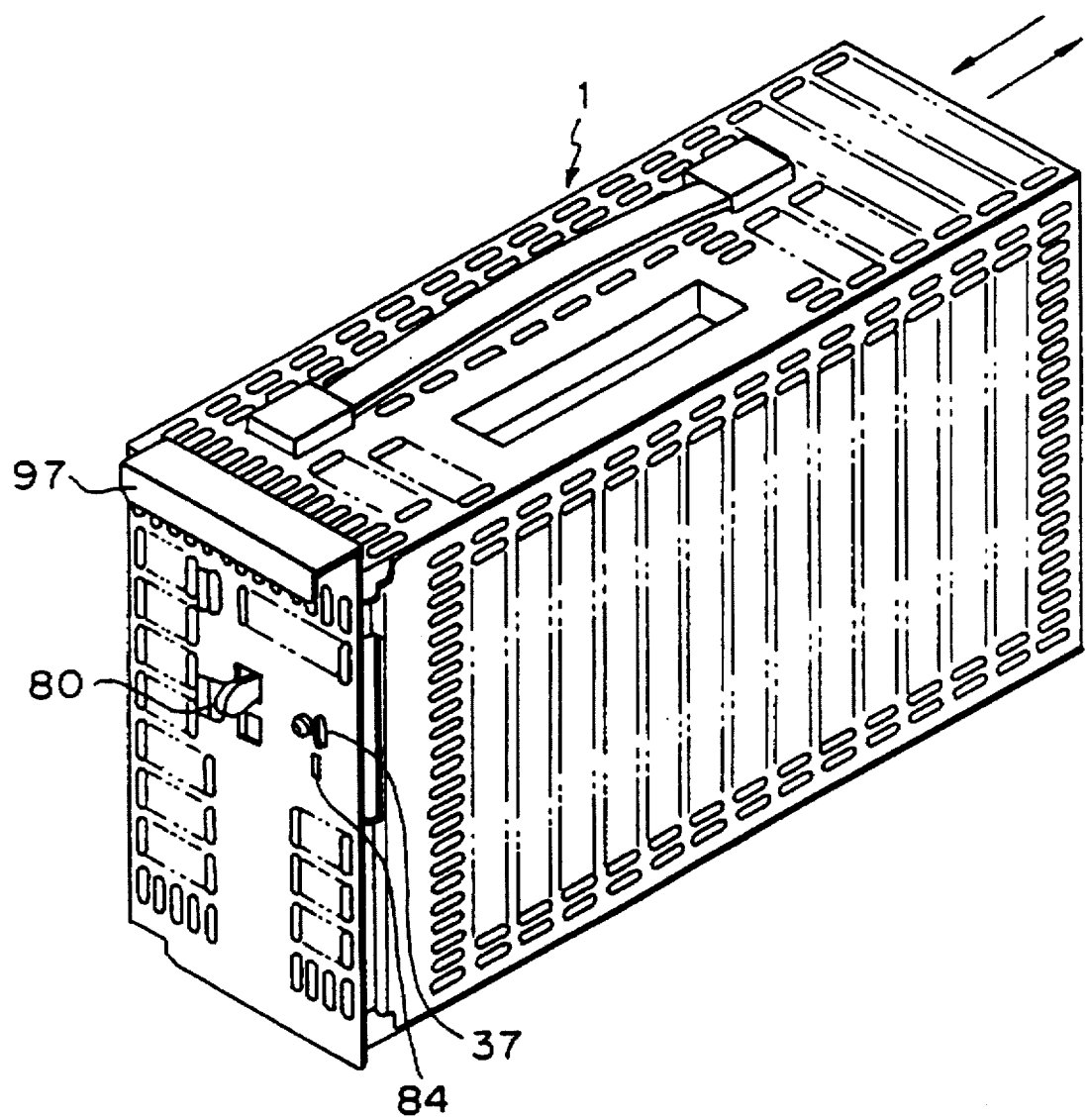
FIG. 14 is an overall perspective view of the magnetic disc unit.

FIGS. 13A is a full perspective view showing a release mode ,of the autolock mechanism, FIG. 13B is a partial perspective view showing a lock mode of the autolock mechanism, and FIG. 14 is an overall perspective view of the magnetic disc unit.

In FIG. 13A, i.e., during the release mode, an autolock frame 95 is in an upper position at which an actuation lever 11' (see FIG. 13B) is pressed to turn ON the reset switch 11, and thus the reset signal RST is issued. In this case, the bottom side of the autolock frame 95 is disengaged from the aforesaid reception point of the locker box, and thus, the unit can be removed from the locker box, in the direction of the arrow illustrated, by pulling on a handle 97.

In FIG. 13B, i.e., during the lock mode, the autolock frame 95 is involved to a lower position by pressing the knob 80 downward, whereby the spring supported actuation lever 11' is freed, and at the same time, the reset switch 11 is made OFF, and thus the reset signal RST is not issued. In this case, the bottom side of the autolock frame 95 is engaged with the aforesaid reception point of the locker box, and thus the unit cannot be removed from the locker box.

Normally, the aforesaid autolock mechanism cannot be seen from outside, as obvious from FIG. 14.

As mentioned above, the data storage apparatus of the present invention can be realized such that the data storage apparatus is connected to the host computer 5 and formed as a disc type storage unit for reading information to the host computer 5 and writing information from the host computer, in which the disc type storage unit has a disc mechanism comprising at least one disc type record medium, a drive means for driving the disc type record medium, a read/write head for reading information from the disc type record medium and writing information to the disc type record medium, and a positioning means for moving the read/write head to a desired track, wherein the disc type storage unit is constructed by: the driver/receiver circuit 22 connected to the host computer 5 via the interface bus 4 for receiving and sending information from and to the host computer 5; the interface control circuit 24 connected to the driver/receiver circuit 22 for controlling an interface protocol; the control circuitry 10 for controlling the disc mechanism; at least one microprocessor (27, 33) connected to both the driver/receiver circuit 22 and the control circuitry 10 for controlling a transmission and reception of information to and from the host computer 5 and said disc mechanism, in accordance with a command issued by the host computer 5; the reset circuit 7 connected to the aforesaid circuit elements for producing the reset signal to initialize same; and a means connected to the reset circuit 7, for causing the reset circuit to compulsorily issue the reset signal.

To summarize the operation of the external storage unit 1 according to the present invention, the external storage unit 1 is connected to and disconnected from the interface bus 4 while keeping the system power 4 alive, by bringing the driver/receiver circuit 22 to a high-impedance state with respect to the interface bus 4. Also, the external storage unit 1 is connected to and disconnected from the interface bus 4 while keeping the system power 13 alive, by deenergizing both the driver/receiver circuit 22 and the drive means.

The above operation can be expressed as follows, in the form of a sequence of method steps:

Step a

Identifying which of the external storage units is to be removed from or inserted to the system.

Step b

Forming a high-impedance state at the driver/receiver circuit of the above identified external storage unit with respect to the interface bus 4.

Step c

Disconnecting or connecting the above-identified external storage unit 1 from or to the interface bus 4.

The following method can be also carried out independently or together with execution of the above-metnioned method of handling the external storage unit.

Step a

Identifying which of the external storage units 1 is to be removed from or inserted to the system.

Step b

Deeneenergizing both the driver/receiver circuit 22 and the drive means.

Step c

Disconnecting or connecting the above-identified external storage unit 1 from or to the interface bus 4.

When the magnetic disc unit 1 is removed from the interface bus 4, it is preferable to first confirm that the unit 1 is in a bus-free state, i.e., that the unit 1 is not performing a communication with the interface bus 4. It is possible, however, even if a bus sequence is running on the interface bus 4, to remove the unit 1 to be replaced if it is not in the access state (the lamp 37 is not flashing), i.e., the unit 1 is isolated from the bus 4 (the lamp 37 is turned OFF).

FIG. 15 is a timing chart for explaining two bus-free states. This timing chart is based on a regulation issued by the American National Standard Institute (ANSI). In the timing chart, a selection signal +SEL is released (falling of the waveform) when a series of accesses is finished, then a busy signal +BSY is also released, and thereafter, a phase of the sequence enters a bus-free state. After this state is entered, other signals are also released. The previously mentioned bus-free state is located at the phase mentioned above.

It is also possible to remove the magnetic disc unit 1 from the system by monitoring the aforesaid ready indication lamp 37 (FIG. 4B, FIG. 11, etc.). The lamp 37 is selectively controlled by the MPU 33, as explained before, in the following two modes 1) and 2).

1) The lamp 37 flashes when the magnetic disc unit 1 is in an access state.

2) The lamp 37 is turned ON when the unit 1 is not in the access state but in a ready state.

Thus, when the external reset switch 11 is made ON, and accordingly, the reset signal RST becomes active the MPU 33 does not produce a signal for turning ON the lamp 37, since the MPU 33 is reset by the now active signal RST, whereby the lamp 37 is turned OFF. Accordingly, it is possible to determine when the unit 1 can be removed by visually monitoring whether the lamp 37 is ON or OFF.

Namely, when the unit 1 is to be removed, it is preferable to first confirm that the lamp 37 is OFF, and to then pull up the knob 80 of FIG. 11 for releasing the aforesaid interlock mechanism engaged with the corresponding locker box.

The external reset switch 11 can be a remote control reset switch controlled by the host computer 5.

As mentioned above in detail, according to the present invention, it is possible to realize an on-line maintenance for external storage units, wherein the units can be replaced without disconnecting the system power.

As a result, in a continuous operation fault tolerant computer system, the magnetic disc units therein can be replaced for maintenance, and thus the continuous operation can be guaranteed without adverse system down time. This increases the system reliability and improves the throughput of the computer.

We claim:

1. A data storage apparatus, connectable to an interface bus, comprising:

a first sub-unit and a second sub-unit formed integrally as one body, said second sub-unit including a record medium and a motor driving the record medium and said first sub-unit containing control circuitry controlling the motor of said second sub-unit, said control circuitry including a driver/receiver circuit;

a connector, coupled to the interface bus and the driver/receiver circuit of said first sub-unit, to connect and disconnect the interface bus and the driver/receiver circuit of said first sub-unit:

means for detecting that the driver/receiver circuit of said first sub-unit is being disconnected from the interface bus, and for generating a reset signal before said connector is completely disconnected; and means responsive to the reset signal output from said detecting means, for deenergizing said second sub-unit to create a state in which an output signal from the driver/receiver circuit of the control circuitry is not output and in which the motor in said second sub-unit stops, so that said data storage apparatus capable of being disconnected from the interface bus without transmitting noise to the interface bus.

2. A data storage apparatus, connectable to a computer system through an interface bus, comprising:

a first sub-unit and a second sub-unit formed integrally as one body, the second sub-unit containing at least a record medium and a motor driving the record medium and the first sub-unit containing control circuitry controlling the second sub-unit and a driver circuit outputting a signal under control of the control circuitry;

a connector, coupled to the interface bus and the driver circuit of the first sub-unit, connecting and disconnecting the interface bus with the driver circuit of the first sub-unit; and a mechanical reset switch connected to the control circuitry of the first sub-unit and capable of being manipulated by an operator, creating a state in which signal output from the driver circuit of the control circuitry is prevented and in which the motor in the second sub-unit stops, so that the data storage apparatus is connected to and/or disconnected from the interface bus by connecting and/or disconnecting the connector without disconnecting power of the computer system and transmitting noise to the interface bus;

the first sub-unit including a reset signal generating circuit connected to the mechanical reset switch, for generating a reset signal, the reset signal generating circuit having a power voltage monitor circuit having an input and an output included in the control circuitry, the power voltage monitor circuit receiving, at the input, a power voltage having a level energizing the control circuitry, and monitoring the level of the power voltage to determine when the level becomes higher than a threshold level at which a normal operation of the control circuitry occurs, the power voltage monitor circuit producing, at the output, the reset signal when the level of the power voltage is higher than the threshold level and when an external command is applied to the power voltage monitor circuit.

3. A data storage apparatus as set forth in claim 2, wherein said power voltage monitor circuit comprises at least one comparator having first and second comparator inputs and a comparator output receiving said threshold level at the first comparator input; and a resistor connected to said second comparator input and to a power source, the second comparator input being also connected in series with said external reset switch, and being grounded when the external reset switch is operated producing said reset signal from the comparator output of the comparator.

4. A data storage apparatus connectable to a host computer through an interface bus, comprising:

a plurality of external storage units each provided with an external reset switch generating an external command, each external storage unit including a first sub-unit and a second sub-unit formed integrally as one body, the second sub-unit containing at least a record medium and a motor driving the record medium and the first sub-unit containing control circuitry controlling the second sub-unit and a driver circuit outputting a signal under control of the control circuitry;

a connector, coupled to the interface bus and the driver circuit of said first sub-unit, connecting and disconnecting the interface bus with the driver circuit of said first sub-unit; and a mechanical reset switch connected to the control circuitry of said first sub-unit and capable of being manipulated by an operator, creating a state in which an output signal from the driver circuit of said first sub-unit is prevented from being output and in which the motor in said second sub-unit stops, so that said data storage apparatus is connected to and/or disconnected from the interface bus by connecting and/or disconnecting said connector without disconnecting power of the host computer and without transmitting noise to the interface bus;

said first sub-unit including a reset signal generating circuit connected to said mechanical reset switch, for generating a reset signal, first means for creating a high-impedance state, including a driver/receiver circuit in said control circuitry interfacing with the interface bus, second means for producing a reset signal from the external command, the reset signal activating said first means for creating the high-impedance state, and a read/write and drive controller connected to said first means and said second sub-unit, said read/write and drive controller being initialized by receiving the reset signal from said second means, said read/write and drive controller including a protocol control part, connected to said drive/receiver circuit, performing a command control on the interface bus between said data storage apparatus and the host computer;

a data buffer control circuit connected to said protocol control part and controlling transfer of read and write data;

a drive control circuit connected to said data buffer control circuit and controlling driving of said second sub-unit;

at least one microprocessor unit connected to and managing said data buffer and drive control circuits; and a read/write control part controlling, with cooperation of said drive control circuit, read/write operations of the read and write data, each of the buffer and drive control circuits being initialized by the reset signal generated from said second means.

5. A data storage apparatus connectable to a host computer through an interface bus, comprising:

a connector connected to the interface bus;

a driver circuit connected to the interface bus and receiving information sent through the interface bus from the host computer;

a record medium for storing information to be sent through said driver circuit;

a motor connected to said record medium, for driving said record medium;

read means for reading information from said record medium;

control circuitry, connected to said driver circuit and to said motor and said read means, and including at least one microprocessor receiving a command from the host computer and controlling said motor and said read means;

a reset circuit producing a reset signal for creating a reset state in which said control circuitry is initialized and in which said motor stops; and a mechanical reset switch, connected to said reset circuit and capable of being manipulated by an operator, compulsorily generating said reset signal, so that said data storage apparatus is replaced by connecting and/or disconnecting said connector to and/or from the interface bus without disconnecting power of the host computer and transmitting noise to the interface bus, said reset circuit having an input and an output, included in said control circuitry, of a power voltage monitor circuit receiving, at the input, a power voltage having a level energizing said control circuitry, and monitoring the level of the power voltage to determine when the level becomes higher than a threshold level at which a normal operation of said control circuitry occurs, the power voltage monitor circuit producing, at the output, the reset signal when the level of the power voltage is higher than the threshold level and when the external command is applied to the power voltage monitor circuit.

6. A data storage apparatus as set forth in claim 5, wherein said power voltage monitor circuit comprises at least one comparator having first and second comparator inputs and a comparator output receiving said threshold level at the first comparator input; and a resistor connected to said second comparator input and to a power source, the second comparator input being also connected in series with said external reset switch, and being grounded when the external reset switch is operated producing said reset signal from the comparator output of the comparator.

7. A data storage apparatus, connectable to an interface bus, comprising:

a first sub-unit and a second sub-unit formed integrally as one body, said second sub-unit including a record medium and a motor driving the record medium and said first sub-unit containing control circuitry controlling the motor of said second sub-unit, the control circuitry including a driver/receiver circuit; and a connector, coupled to the interface bus and the driver/receiver circuit of said first sub-unit, to connect and disconnect the interface bus and the driver/receiver circuit of said first sub-unit;

means for detecting that the driver/receiver circuit of said first sub-unit is being disconnected from the interface bus, and for generating a reset signal before said connector is completely disconnected; and means responsive to the reset signal output from said detecting means for deenergizing said second sub-unit, and for creating a state in which an output signal from the driver/receiver circuit of the control circuitry is prevented from being output and in which the motor in said second sub-unit stops, so that said data storage apparatus capable of being disconnected from the interface bus without transmitting noise to the interface bus.

* * * * *

UNITED STATES PATENT AND TRADEMARK OFFICE
CERTIFICATE OF CORRECTION

PATENT NO. : 5,721,838
DATED : Feb. 24, 1998
INVENTOR(S) : TAKAHASHI et al.

It is certified that error appears in the above-identified patent and that said Letters Patent is hereby corrected as shown below:

TITLE PAGE: [54] Title, line 4, after "INTERFACE" insert --BUS--.

Col. 1, line 4, after "INTERFACE" insert --BUS--.

Signed and Sealed this

Seventh Day of July, 1998

Attest:

BRUCE LEHMAN

Attesting Officer

Commissioner of Patents and Trademarks